United States Patent
Rombakh et al.

(10) Patent No.: US 10,841,621 B2
(45) Date of Patent: Nov. 17, 2020

(54) FAULT RECOVERY OF VIDEO BITSTREAM IN REMOTE SESSIONS

(71) Applicant: Wyse Technology L.L.C., Santa Clara, CA (US)

(72) Inventors: Oleg Rombakh, Los Gatos, CA (US); Richard Goldberg, Los Gatos, CA (US)

(73) Assignee: Wyse Technology L.L.C., Santa Clara, CA (US)

( * ) Notice: Subject to any disclaimer, the term of this patent is extended or adjusted under 35 U.S.C. 154(b) by 289 days.

(21) Appl. No.: 15/446,143

(22) Filed: Mar. 1, 2017

(65) Prior Publication Data

US 2018/0255325 A1  Sep. 6, 2018

(51) Int. Cl.
*H04N 19/89* (2014.01)
*H04N 19/44* (2014.01)
*H04N 19/174* (2014.01)

(52) U.S. Cl.
CPC ........... *H04N 19/89* (2014.11); *H04N 19/174* (2014.11); *H04N 19/44* (2014.11)

(58) Field of Classification Search
CPC ... H04L 1/0045; H04L 1/0061; H04L 1/0008; H04L 1/0063; H04L 1/004; H04L 47/32; G06F 11/1004; G06F 11/1402; G06F 11/14; G06F 11/2007; H04N 19/89
USPC ............... 714/746, 701, 748, 758, 776, 747; 375/240.02, 240.27, E7.281, E7.159; 709/203, 217
See application file for complete search history.

(56) References Cited

U.S. PATENT DOCUMENTS

| | | | | |
|---|---|---|---|---|
| 4,797,706 A * | 1/1989 | Sugishima | ......... | H04N 1/32502 358/300 |
| 5,452,006 A * | 9/1995 | Auld | ...................... | H04N 19/00 375/240.01 |
| 5,638,384 A * | 6/1997 | Hayashi | ................ | H04L 1/0007 714/752 |
| 5,768,533 A * | 6/1998 | Ran | ........................ | H04N 7/141 709/247 |
| 6,016,508 A * | 1/2000 | Chu | .................. | H04L 29/12009 709/203 |
| 6,128,763 A * | 10/2000 | LoGalbo | ............... | H04L 1/0007 714/751 |
| 6,185,635 B1 * | 2/2001 | O'Loughlin | ............ | H04L 49/90 370/364 |

(Continued)

*Primary Examiner* — Daniel Chang
(74) *Attorney, Agent, or Firm* — Kirton McConkie; Brian Tucker

(57) ABSTRACT

Fault recovery of a video bitstream can be performed in a remote session. A decoder of a remote display protocol client can be configured to process a video bitstream that is transferred over a virtual channel of a remote session. As part of processing the video bitstream prior to passing it to a hardware decoder, the decoder can detect the occurrence of an error in the bitstream and then cause the remote display protocol client to employ the remote display protocol which encapsulates the virtual channel to request an I-frame from the remote display protocol service. This will force the encoder to send an I-frame even if the desktop has low entropy thereby minimizing how long a glitch may persist. Because the remote display protocol itself is employed to request the I-frame, there is no requirement to modify the video stream protocol.

15 Claims, 10 Drawing Sheets

(56) References Cited

U.S. PATENT DOCUMENTS

| | | | |
|---|---|---|---|
| 6,272,660 B1* | 8/2001 | Chen | H03M 13/09 714/794 |
| 6,304,607 B1* | 10/2001 | Talluri | G06T 9/005 375/240.27 |
| 6,404,817 B1* | 6/2002 | Saha | H04N 19/895 348/425.2 |
| 6,473,875 B1* | 10/2002 | Anderson | H04L 1/0041 714/701 |
| 6,493,838 B1* | 12/2002 | Kikuchi | G11B 27/3027 375/E7.211 |
| 6,744,924 B1* | 6/2004 | Hannuksela | H04N 19/89 375/E7.279 |
| 7,124,333 B2* | 10/2006 | Fukushima | H04L 1/1838 714/701 |
| 7,296,204 B2* | 11/2007 | Merritt | H04L 1/1614 714/748 |
| 7,802,168 B1* | 9/2010 | Apostolopoulos | H04N 19/107 714/776 |
| 8,903,897 B2* | 12/2014 | Relan | G06F 9/452 709/203 |
| 9,875,076 B1* | 1/2018 | Fausak | G06F 9/452 |
| 2001/0043615 A1* | 11/2001 | Park | H04L 65/607 370/474 |
| 2002/0181404 A1* | 12/2002 | Insler | H04L 27/2601 370/241 |
| 2003/0193948 A1* | 10/2003 | Hatae | H04L 49/9052 370/392 |
| 2004/0062267 A1* | 4/2004 | Minami | H04L 47/10 370/463 |
| 2004/0103218 A1* | 5/2004 | Blumrich | G06F 9/526 709/249 |
| 2004/0194001 A1* | 9/2004 | Ting | H04L 1/00 714/776 |
| 2005/0089104 A1* | 4/2005 | Kim | H04N 19/895 375/240.27 |
| 2005/0135477 A1* | 6/2005 | Zhang | H04N 19/34 375/240.08 |
| 2005/0168590 A1* | 8/2005 | Takizawa | H04N 21/23614 348/222.1 |
| 2006/0023789 A1* | 2/2006 | Yamashita | G06F 12/0862 375/240.16 |
| 2006/0120464 A1* | 6/2006 | Hannuksela | H04N 19/51 375/240.27 |
| 2006/0146830 A1* | 7/2006 | Lin | H04N 19/89 370/394 |
| 2006/0282737 A1* | 12/2006 | Shi | H04N 19/895 714/746 |
| 2006/0282855 A1* | 12/2006 | Margulis | H04N 5/44591 725/43 |
| 2007/0019566 A1* | 1/2007 | Sawada | H04L 65/4076 370/252 |
| 2008/0049844 A1* | 2/2008 | Liu | H04N 19/895 375/240.27 |
| 2008/0049845 A1* | 2/2008 | Liu | H04N 19/166 375/240.27 |
| 2009/0141811 A1* | 6/2009 | Mohan | H04N 19/184 375/240.25 |
| 2009/0177952 A1* | 7/2009 | Yokosato | H04N 19/89 714/799 |
| 2009/0213938 A1* | 8/2009 | Lee | H04N 19/70 375/240.24 |
| 2009/0213940 A1* | 8/2009 | Steinbach | H04N 19/166 375/240.27 |
| 2009/0238269 A1* | 9/2009 | Pandit | H04N 19/597 375/240.12 |
| 2010/0011012 A1* | 1/2010 | Rawson | H04L 67/30 707/E17.009 |
| 2010/0231599 A1* | 9/2010 | Tung | H04N 19/00 345/522 |
| 2010/0231797 A1* | 9/2010 | Jiang | H04N 19/895 348/607 |
| 2010/0260269 A1* | 10/2010 | He | H04N 19/895 375/240.27 |
| 2010/0293435 A1* | 11/2010 | Chang | H04L 1/1854 714/758 |
| 2010/0299436 A1* | 11/2010 | Khalid | G09G 5/006 709/226 |
| 2011/0010607 A1* | 1/2011 | Raveendran | H04L 47/14 714/776 |
| 2011/0096835 A1* | 4/2011 | Lim | H04N 19/30 375/240.12 |
| 2011/0205343 A1* | 8/2011 | Hyodo | H04N 13/128 348/54 |
| 2012/0272114 A1* | 10/2012 | Cho | G06F 11/141 714/748 |
| 2012/0300663 A1* | 11/2012 | Lu | H04L 1/1877 370/252 |
| 2013/0018939 A1* | 1/2013 | Chawla | H04L 67/08 709/203 |
| 2013/0058394 A1* | 3/2013 | Nilsson | H04N 19/61 375/240.02 |
| 2013/0117796 A1* | 5/2013 | Qi | H04N 21/44209 725/116 |
| 2014/0125685 A1* | 5/2014 | Yeh | G09G 5/393 345/545 |
| 2015/0163520 A1* | 6/2015 | Martin | H04N 19/46 380/240 |
| 2015/0326884 A1* | 11/2015 | Bae | H04N 19/182 375/240.27 |
| 2015/0341724 A1* | 11/2015 | Pedersen | H04R 5/04 381/300 |
| 2016/0063667 A1* | 3/2016 | Lu | G06T 1/20 345/522 |
| 2016/0098811 A1* | 4/2016 | Lu | H04N 19/85 345/522 |
| 2017/0339258 A1* | 11/2017 | Momchilov | H04L 69/18 |

\* cited by examiner

FAULT RECOVERY OF VIDEO BITSTREAM IN REMOTE SESSIONS

CROSS-REFERENCE TO RELATED APPLICATIONS

N/A

BACKGROUND

In a remote display protocol session (or "remote session"), a desktop is executed on a server and its graphics (or graphics for a single application) are transferred for display on a client terminal. A remote display protocol defines the mechanisms for transferring these graphics. To more efficiently display a desktop's graphics, it is becoming more common to employ a virtual channel to transfer graphics separately from other content. For example, Microsoft's Remote Desktop Protocol (RDP) uses an H264 encoder (or possibly other encoders) to encapsulate frame by frame a desktop session within the MS-RDPEGFX virtual channel.

Video stream protocols, such as AVC/H264 and HEVC/H265, rely on sequences of key frames (e.g., I-frames) followed by difference frames (e.g., B- or P-frames). These difference frames do not independently define a complete frame, but instead rely on one or more other frames to "predict" the frame. For example, at the beginning of a video sequence, an I-frame may be sent. Then, if the next frame does not significantly differ from the previous frame, a P-frame can be sent which defines the differences. The sending of P-frames may continue as long as the current frame does not differ substantially from the previous frames. In the case of B-frame, the frame can be resolved with reference to previous and subsequent frames.

When the server sends a video bitstream to the client terminal, it is possible that a frame will be dropped (e.g., due to corruption in the video bitstream caused by noise). If this happens, and other frames rely on the dropped frame, the video will likely be displayed with glitches. For example, if the video bitstream includes a series of P-frames and the first P-frame in the series is dropped, each of the subsequent P-frames will refer back to incomplete data (i.e., they will be based on information from the dropped P-frame). As a result, a glitch will appear in the display and persist until an I-frame is sent. If the video has low entropy, the decoder on the server may send I-frames relatively infrequently such that the glitch will persist for a relatively long period. In the context of a remote display protocol session in which the desktop display itself is treated as a video, this low entropy condition may be a common occurrence. For example, during a Power Point presentation, there may be sufficient similarity between slides such that the decoder will not generate an I-frame when the presentation is advanced. If a glitch occurs in this scenario, it could potentially remain for the duration of the presentation.

BRIEF SUMMARY

The present invention extends to methods, systems, and computer program products for performing fault recovery of a video bitstream in a remote session. A decoder of a remote display protocol client can be configured to process a video bitstream that is transferred over a virtual channel of a remote session. As part of processing the video bitstream prior to passing it to a hardware decoder, the decoder can detect the occurrence of an error in the bitstream and then cause the remote display protocol client to employ the remote display protocol which encapsulates the virtual channel to request an I-frame from the remote display protocol service. This will force the encoder to send an I-frame even if the desktop has low entropy thereby minimizing how long a glitch may persist. Because the remote display protocol itself is employed to request the I-frame, there is no requirement to modify the video stream protocol.

In one embodiment, the present invention is implemented as a method for performing fault recovery of a video bitstream in a remote session. A decoder of a remote display protocol client that executes on a client terminal receives a video bitstream via a virtual channel of a remote display protocol connection between the client terminal and a remote session host. The decoder processes the video bitstream to identify the occurrence of an error. In response to identifying an error in the video bitstream, the remote display protocol client sends a request for a key frame to a remote display protocol service executing on the remote session host via the remote display protocol connection.

In another embodiment, the present invention is implemented as computer storage media storing computer executable instructions which when executed on a client terminal implement a remote display protocol client that is configured to perform a method that includes: establishing a remote display protocol connection with a remote display protocol service that executes on a remote session host; establishing a virtual channel within the remote display protocol connection for transferring a video bitstream from an encoder of the remote display protocol service to a decoder of the remote display protocol client; processing, by the decoder, the video bitstream to detect the occurrence of an error in the video bitstream; when an error is detected, modifying, by the decoder, the video bitstream; and in response to detecting the modification to the video bitstream, sending, by the remote display protocol client, a request for a key frame over the remote display protocol connection.

In another embodiment, the present invention is implemented by a remote display protocol client as a method for processing a video bitstream. The video bitstream is received over a virtual channel encapsulated in a remote display protocol connection. Slices are then extracted from the video bitstream. A slice header of each extracted slice is evaluated. In response to detecting an error in a first slice, a slice_id in the slice header of the first slice is set to an invalid value. Upon detecting that the first slice has a slice_id with an invalid value, the remote display protocol client sends a request that a key frame be transmitted as part of the video bitstream that is received over the virtual channel. The request being is over the remote display protocol connection that encapsulates the virtual channel.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

Understanding that these drawings depict only typical embodiments of the invention and are not therefore to be considered limiting of its scope, the invention will be described and explained with additional specificity and detail through the use of the accompanying drawings in which.

DETAILED DESCRIPTION

In this specification and the claims, a video bitstream should be construed as video data that has been encoded in accordance with the H.264 standard, the H.265 standard, or any other compression standard that employs similar techniques for organizing encoded video data into network abstraction layer (NAL) units.

Figure 1:
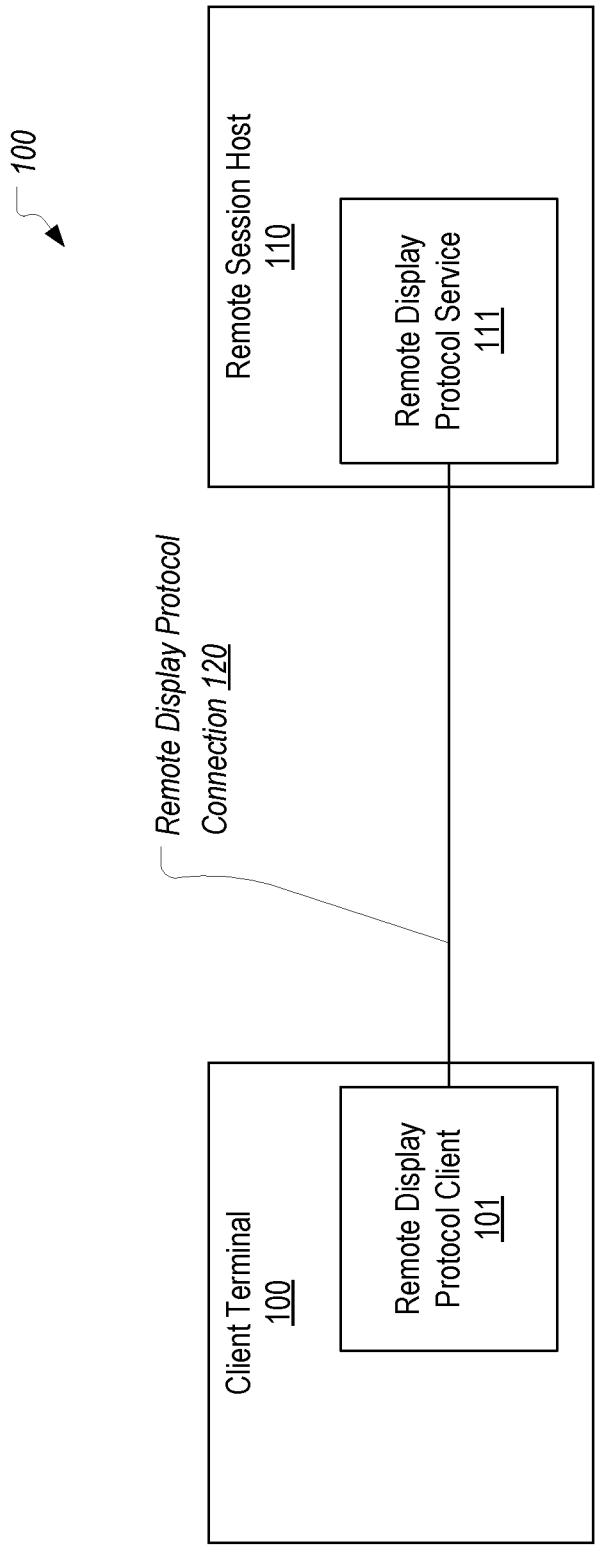
FIG. 1 illustrates an example computing environment in which the present invention can be implemented.

FIG. 1 illustrates an example computing environment 100 in which the present invention can be implemented. Computing environment 100 includes a client terminal 100 and a remote session host 110 that client terminal 100 accesses via a remote display protocol connection 120. Client terminal 100 can be any type of computing device that can execute a remote display protocol client 101 including, for example, a desktop computer, a laptop, a thin client, a smart phone, etc. Remote session host 110 can represent either a virtual or a physical machine (or server) that executes a remote display protocol service 111 (e.g., Windows Server Remote Desktop Services, VMware Horizon, or Citrix XenServer) for the purpose of allowing client terminal 100 to establish remote sessions. A remote session can either provide access to a full desktop (e.g., a remote desktop session) or may provide access to a single application (e.g., a published (or remote) application session). Remote display protocol connection 120 can be established using any of the various remote display protocols including RDP, ICA, PCoIP, etc.

Figure 2:
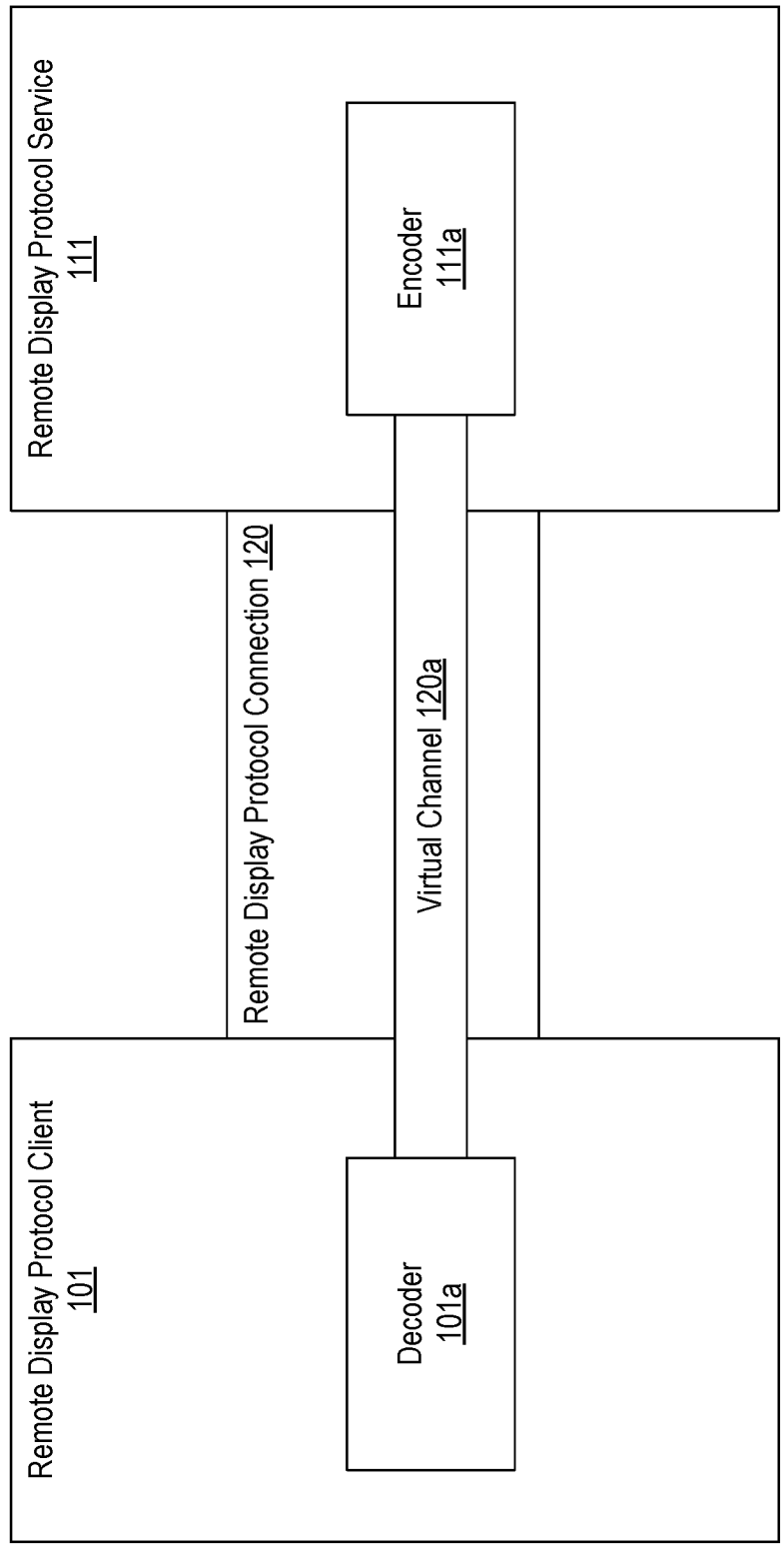
FIG. 2 illustrates how a decoder of a remote display protocol client can receive a video bitstream via a virtual channel from a encoder of a remote display protocol service.

As shown in FIG. 2, remote display protocol client 101 can include a decoder 101a while remote display protocol service 111 can include an encoder 111a. Encoder 111a can be configured to generate a video bitstream from a remote session's graphics data. For example, if remote display protocol service 111 is the Windows Server Remote Desktop Services, encoder 111a can be configured to encode the graphics display data generated in a remote terminal server session using the H.264 standard. Encoder 111a can be configured to transfer a video bitstream to client terminal 100 via virtual channel 120a of remote display protocol connection 120. For example, virtual channel 120a could be a dynamic virtual channel that embeds the Remote Desktop Protocol: Graphics Pipeline Extension as defined in MS-RDPEGFX. Decoder 101a can function as (or otherwise be associated with) a virtual channel endpoint for virtual channel 120a such that it receives the video bitstream transferred over virtual channel 120a.

In accordance with embodiments of the present invention, decoder 101a can be configured to process a video bitstream received via virtual channel 120a and detect the occurrence of an error in the video bitstream. When an error is detected, decoder 101a can notify remote display protocol client 101 which will then send a request for an I-frame to remote display protocol service 111 via remote display protocol connection 120. In this way, errors in a video bitstream received via a virtual channel can be rectified using communications in the remote display protocol connection that encapsulates the virtual channel. This will allow errors to be rectified in a manner that is independent of the video encoding standard.

Figure 3:
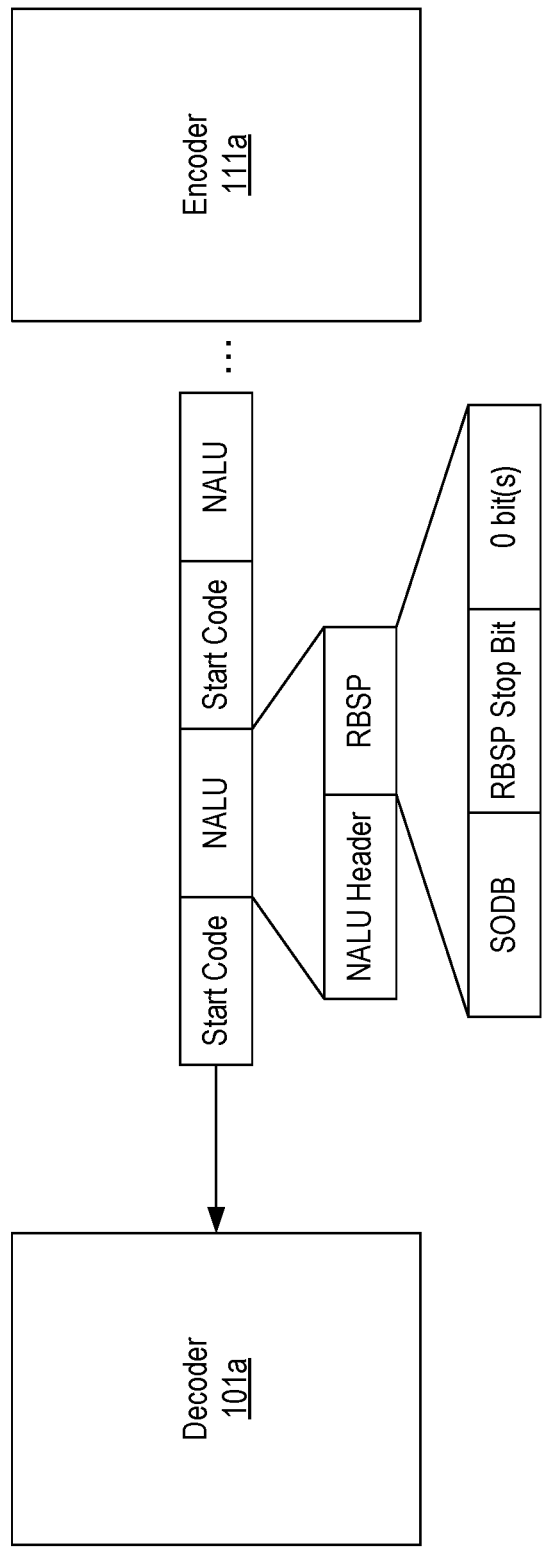
FIG. 3 illustrates the structure of a video bitstream that conforms to an example video encoding standard with which the present invention can be configured to operate.

FIG. 3 provides a more detailed example of how a video bitstream can be transferred over virtual channel 120a. FIG. 3 is based on the H.264 standard but can generally represent a video bitstream configured in accordance with similar standards. An encoder that is configured to produce an H.264 video bitstream (e.g., encoder 111a) will encode the video data into a string of data bits (SODB). The H.264 specification defines SODB as "a sequence of some number of bits representing syntax elements present within a raw byte sequence payload prior to the raw byte sequence payload stop bit." As shown in FIG. 3, a raw byte sequence payload (RBSP) contains a SODB followed by a RBSP stop bit and some number of 0 bits. The RBSP stop bit is set to 1 and will be the last 1 in the RBSP (i.e., the closest 1 to the end of the RBSP). A number of 0 bits are added after the RBSP stop bit so that the RBSP will be byte aligned.

A RBSP will be encapsulated in a NAL unit (NALU) by appending a NALU header at the front of the RBSP. Then, to identify the start of a NALU, a prefix is added to each NALU. This prefix will be either 0x000001 or 0x00000001 depending on whether the NALU is the first in a sequence of NALUs that are being transmitted. Although not shown in FIG. 3, to ensure that these start code patterns will not occur within a RBSP, an emulation prevention three byte (0x03) is added after any occurrence of 0x0000 within the RBSP.

When decoder 101a receives the video bitstream from encoder 111a, it will parse the video bitstream to extract the SODBs, cache the content of the SODBs into structures that represent individual data units (e.g., picture parameters, slice parameters, SEI payloads, etc.), and then, once enough data to construct the next frame has been cached, pass the cached data onto a hardware API. It is noted that the data required to construct a single frame will oftentimes span multiple NALUs. In some embodiments, decoder 101a may employ a hardware abstraction API that would entail loading the cached data into generalized structures that could represent data units from multiple encoding standards. This hardware abstraction API would therefore allow decoder 101a to be employed to decode video bitstreams that conform to multiple different encoding standards (e.g., H.264, VP9, HEVC, etc.).

Figure 4:
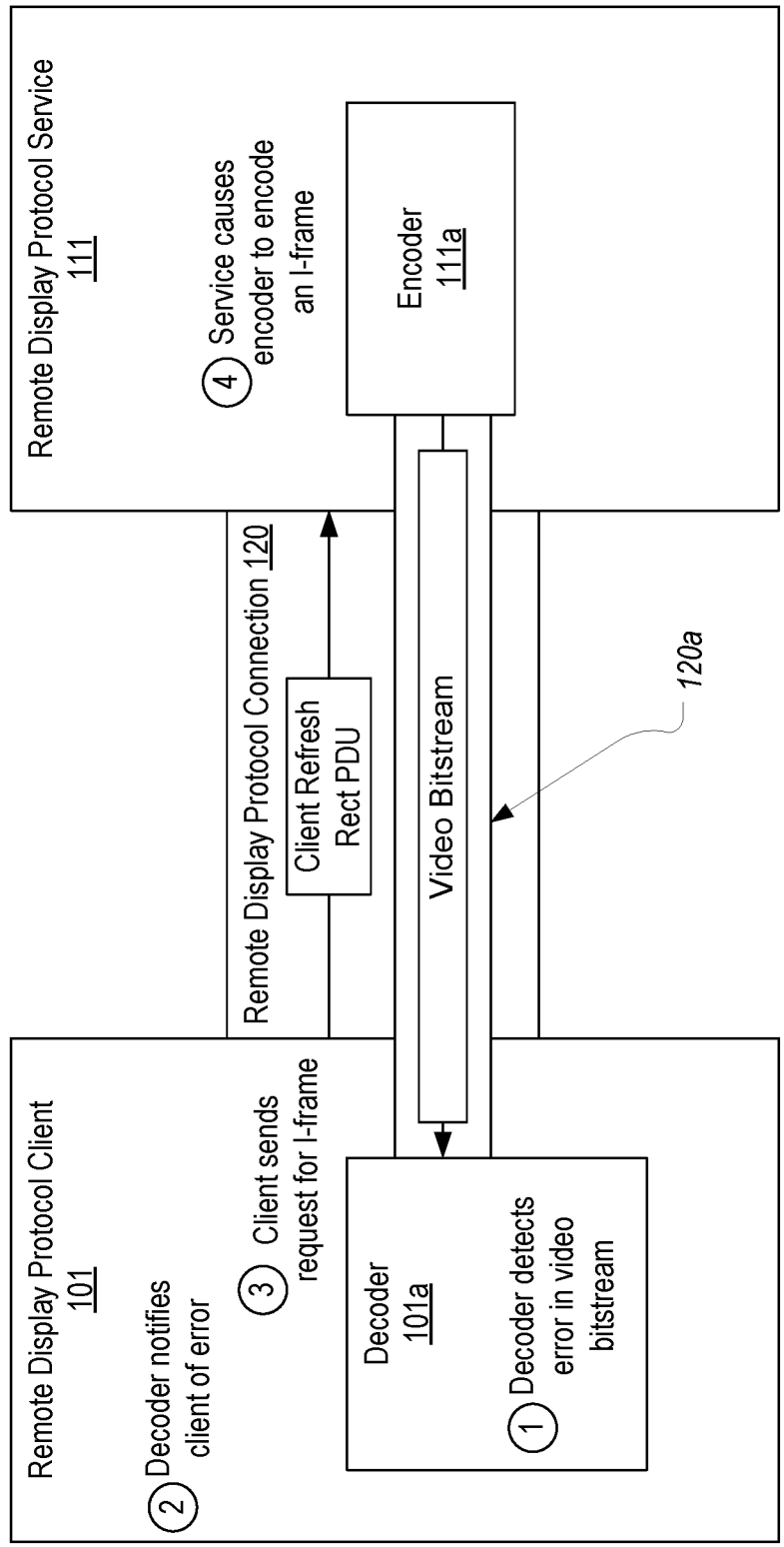
FIG. 4 illustrates an overview of how a remote display protocol client can request a key frame via the remote display protocol connection when an error is detected in a video bitstream that is transferred via a virtual channel encapsulated in the remote display protocol connection.

FIG. 4 provides an overview of how the present invention can perform fault recovery of a video bitstream in a remote session. As an initial step of the decoding process, decoder 101a can examine the video bitstream for start codes to thereby identify and extract the NALUs. With the NALUs extracted, decoder 101a can employ the NALU header to identify the type of the NALU and then parse the RBSP in accordance with the type. As mentioned above, the parsed out data units can then be cached into the appropriate structures. During this process of parsing the video bitstream and loading the individual data units into the structures, decoder 101a can perform a number of checks to detect whether an error has occurred as represented in step 1. If an error is detected, decoder 101a can notify remote display protocol client 101 of the error in step 2. For example, decoder 101a may set a slice identifier in the video bitstream to a value that represents the occurrence of an error as will be described more fully below. In step 3, and in response to the notification from decoder 101a, remote display protocol client 101 can send a request for an I-frame to remote display protocol service 111. For example, in a Windows environment, remote display protocol client 101 could send a Client Refresh Rect PDU via remote display protocol connection 120 in accordance with MS-RDPCGR [2.2.11.2]. Finally, in step 4, and in response to receiving the request for the I-frame, remote display protocol service 111 will cause encoder 111a to encode an I-frame (e.g., rather than a P- or B-frame that it otherwise would have encoded) that will be included in the video bitstream sent over virtual channel 120a. In this way, decoder 101a can cause an I-frame to be sent relatively quickly after the detection of an error. Importantly, decoder 101a causes the I-frame to be requested using the main channel (remote display protocol connection 120) rather than virtual channel 120a.

Figure 5A:
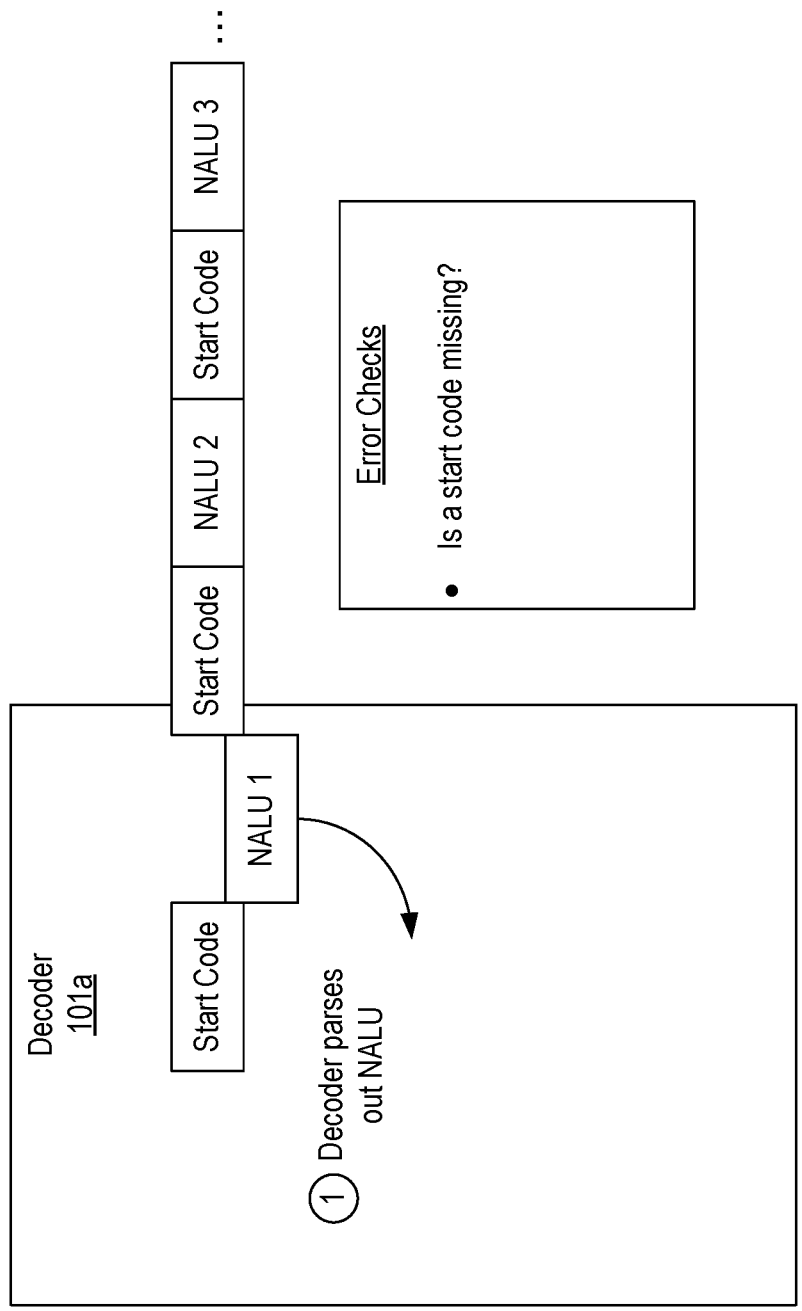
FIGS. 5A-5E illustrate a sequence of steps that can be performed to implement fault recovery of a video bitstream in a remote session.

FIGS. 5A-5E illustrate a more detailed example of how decoder 101a can identify an error in the video bitstream and then notify remote display protocol client 101 of the error. In FIG. 5A, the video bitstream consisting of a sequence of NALUs separated by start codes is shown as being received at decoder 101a. As indicated above, this video bitstream will be received over virtual channel 120a. Decoder 101a can be configured to continuously process the bitstream by identifying and extracting each NALU as represented by step 1 in FIG. 5A. As part of step 1, decoder 101a can be configured to detect whether a start code is missing. In some embodiments, this may be accomplished by determining that a start code has not been detected after examining a specified length of data. For example, if a start code is not detected after NALU 1 (e.g., because the start code became corrupted) such that the next start code that is detected is the start code preceding NALU 3, it will appear to decoder 101a as if NALU 1 and NALU 2 were actually a single NALU. If the combined length of NALU 1 and NALU 2 (and any corrupted start code that may appear in between) exceeds the defined threshold, decoder 101a can detect the occurrence of an error and can mark any slices in NALU 1 and 2 as invalid as will be described in more detail below. Alternatively, if the start code has been corrupted, an invalid sequence may exist in the video bitstream which could be detected by decoder 101a.

Figure 5B:
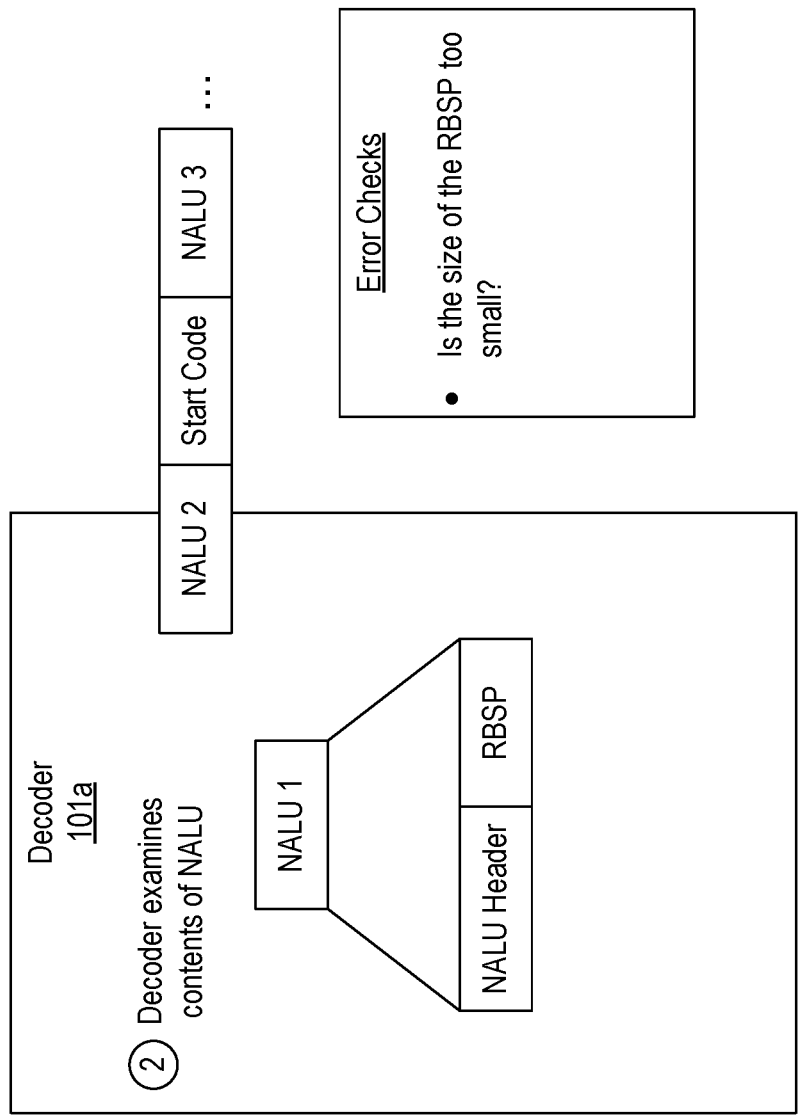

Turning to FIG. 5B and assuming that a start code was detected to thereby allow NALU 1 to be extracted, decoder 101a will examine the contents of NALU 1, as represented in step 2, in order to cache the individual data units (or syntax elements) within the RBSP encapsulated in NALU 1. The RBSP of any given NALU can contain one or more data units. For example, a NALU may include a picture parameter set as well as a number of slices for a particular frame. A subsequent NALU may also contain a number of slices for the same frame or for a subsequent frame. Therefore, the exact contents of any NALU are not essential to the invention. In any case, as part of examining the contents of a NALU, decoder 101a can identify the size of the RBSP and determine that an error has occurred when the size is less than some defined threshold. For example, if the size of the RBSP is less than 7 bytes, it is likely that the RBSP has been truncated and decoder 101a can set the slice_id of any slices defined in the RBSP to an invalid value.

Once the individual data units have been parsed out of the RBSP and cached in the corresponding data structures, decoder 101a can then perform a number of other error checks based on the values of the individual data units. For example, as represented in step 3 of FIG. 5C, decoder 101a may process one or more RBSPs to extract a sequence parameter set, a picture parameter set, and a number of slices for a current frame. As mentioned above, decoder 101a can cache the data required to construct a single frame prior to passing this data onto the hardware decoder which will then render the frame. Therefore, in addition to providing a way to determine when to request an I-frame, the error checks performed by decoder 101a can also serve as a way to prevent erroneous data from being passed to the hardware decoder (which may crash if certain types of errors exist).

Figure 5C:
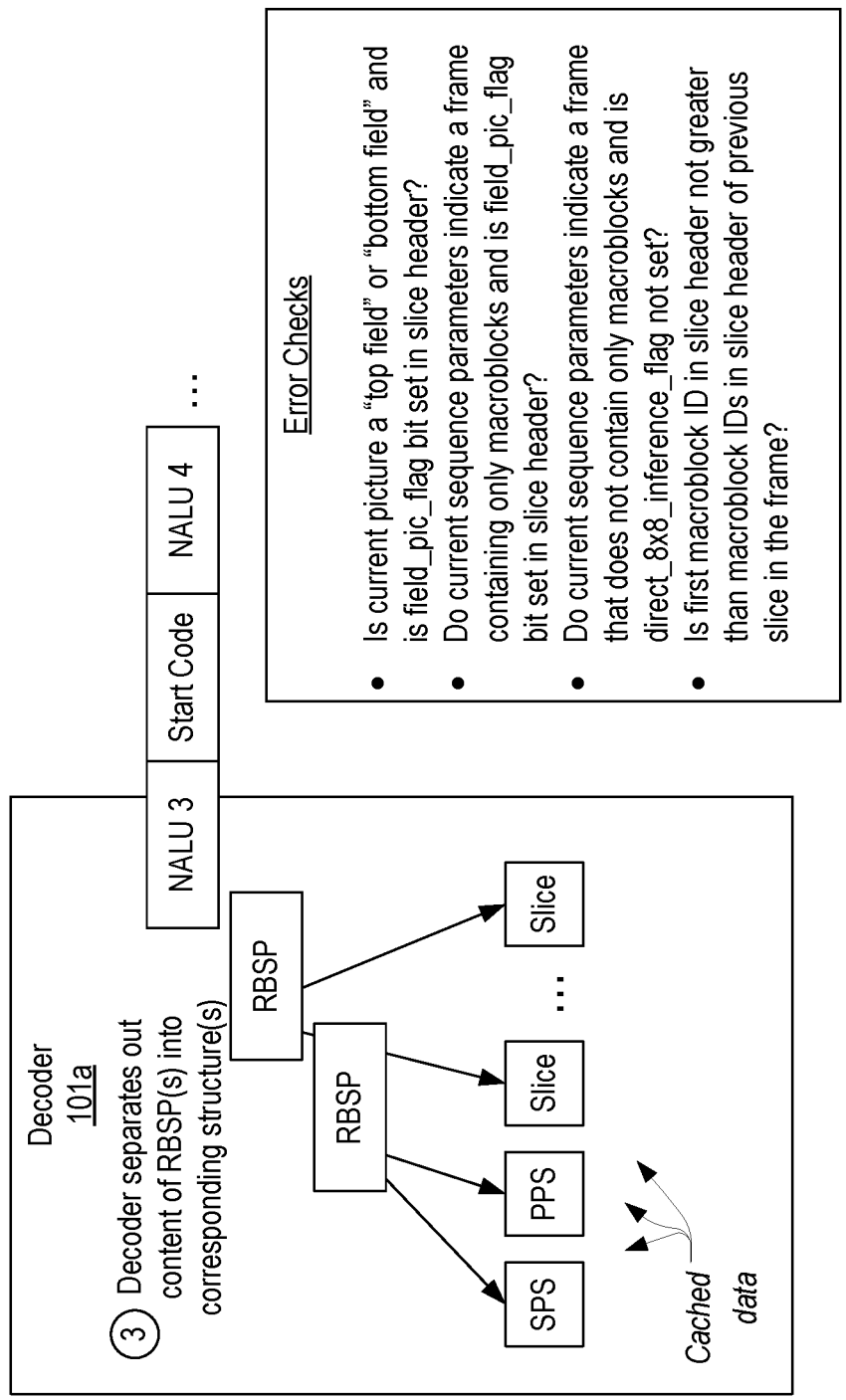
Figure 5D:
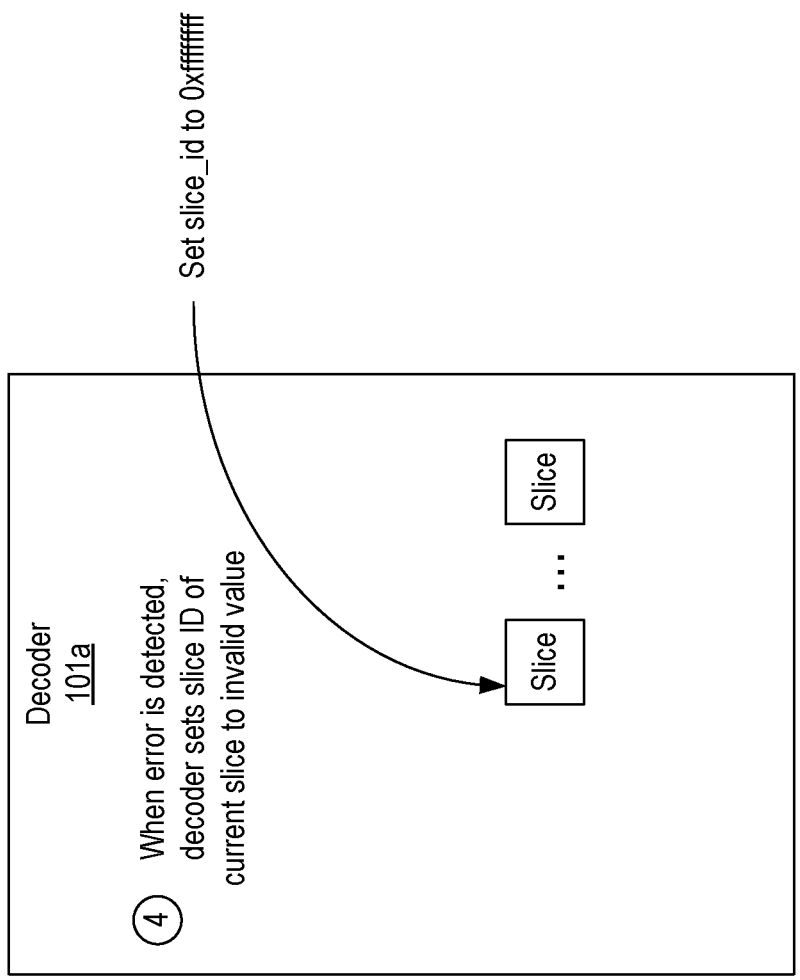

In FIG. 5C, it is assumed that the current frame data includes a sequence parameter set (SPS), a picture parameter set (PPS), and a number of slices. With these data units cached (or as part of caching the data units), decoder 101a can examine the value of certain bits within the data units to detect possible error conditions. For example, if the current picture is identified as a top field or a bottom field (which would be defined in the PPS), the field_pic_flag bit should not be set in any slice header to which the PPS pertains. Therefore, for any slice that has the field_pic_flag bit set in this scenario, decoder 101a can set the slice_id to an invalid value.

As another example, if the SPS indicates that the current frame includes only macroblocks, the field_pic_flag bit in the slice header of any slice should not be set. In such a scenario, if the field_pic_flag bit is set in a particular slice, decoder 101a can set the slice_id to an invalid value. Similarly, if the SPS indicates that the current frame does not only include macroblocks (i.e., frame_mbs_only_flag=0), the direct_8×8_inference_flag of the SPS must be equal to 1. If this condition is not met, decoder 101a can set the slice_id of any slice that references the SPS to an invalid value. Additionally, decoder 101a can examine the value of the first macroblock ID in a slice header (first_mb_in_slice) and determine whether it is greater than the macroblock IDs in the previous slice. If this condition is not met, decoder 101a can set the slice_id of the slice to an invalid value.

Whenever an error is detected, the slice_id of any slice that is associated with the error can be set to an invalid value. For example, in FIG. 5D, decoder 101a is shown as setting the slice_id of one of the slices to 0xffffffff. As described above, the slices that decoder 101a will modify to include an invalid slice_id will depend on the type of error. Although not shown, in some embodiments, decoder 101a can be configured to rectify the error condition in addition to setting the slice_id to an invalid value. For example, if frame_mbs_only_flag equals 0 and direct_8×8_inference_flag is also 0, decoder 101a can set direct_8×8_inference_flag to 1 in addition to setting the slice_id to the invalid value. Rectifying the error condition in this manner may prevent a crash if the erroneous data happened to be passed to the hardware decoder. However, in some embodiments, remote display protocol client 101 can be configured to prevent erroneous data from being passed to the hardware decoder as will be described below.

Figure 5E:
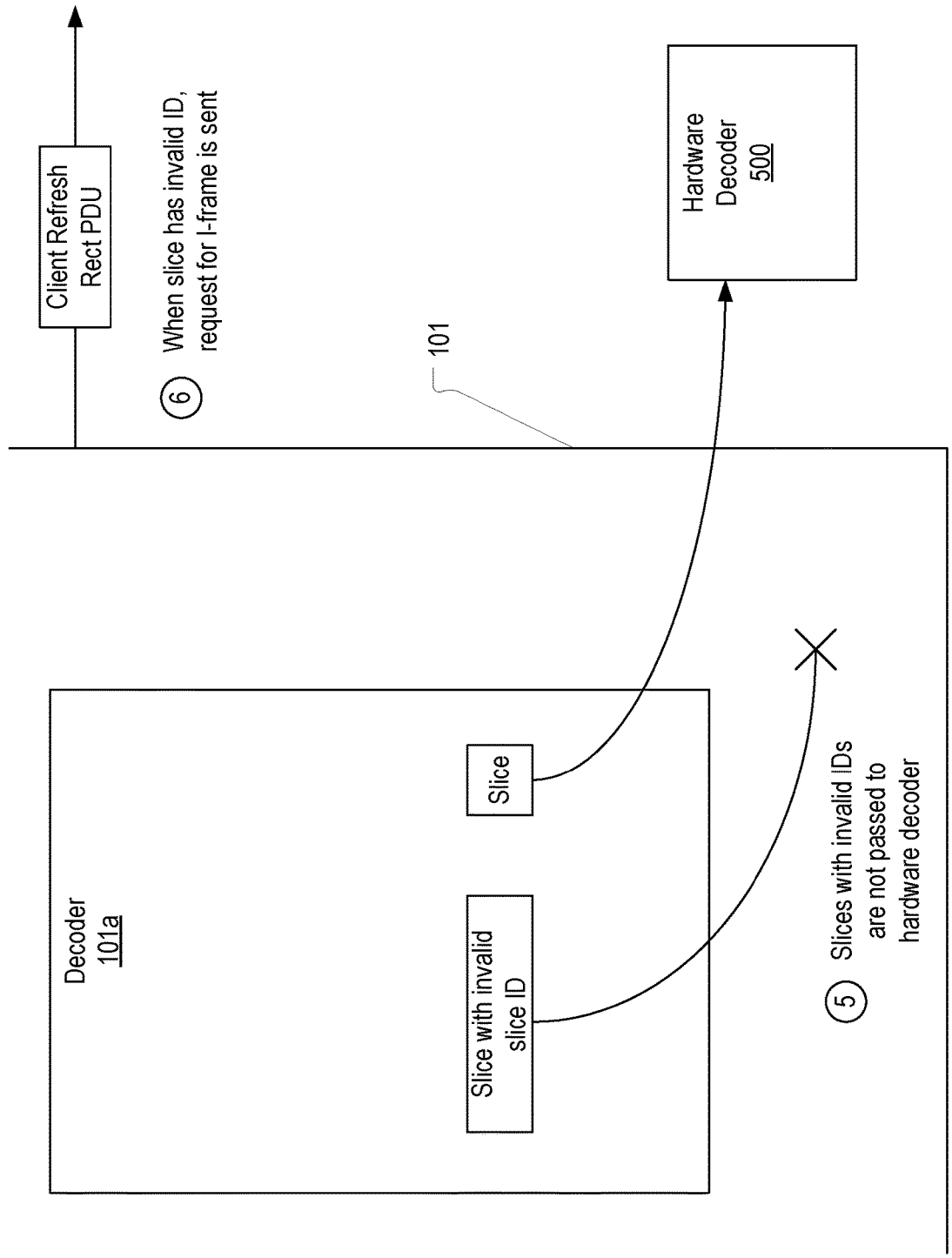

Once the necessary data for constructing a frame has been cached and the data units have been examined for errors, decoder 101a can pass the data to hardware decoder 500 as shown in FIG. 5E. To prevent erroneous data from being provided to hardware decoder 500, remote display protocol client 101 may be configured to detect slices that have a slice_id set to the invalid value (e.g., 0xffffffff) and prevent them from being passed to hardware decoder 500 as represented in step 5. Additionally, whenever remote display protocol client 101 detects a slice with an invalid slice_id, it can send a request for an I-frame over remote display protocol connection 120 as represented in step 6.

When errors occur in the video bitstream, visible errors will likely appear in the displayed frame. For example, if a slice for a frame is not provided to hardware decoder 500, a glitch will likely appear in the area of the display that the slice encompassed. However, because remote display protocol client 101 will have requested an I-frame, the glitch will be quickly remedied. In essence, decoder 101*a* functions as a filter for predicting when a glitch may appear in a video so that it may take preemptive action to refresh the video.

Figure 6:
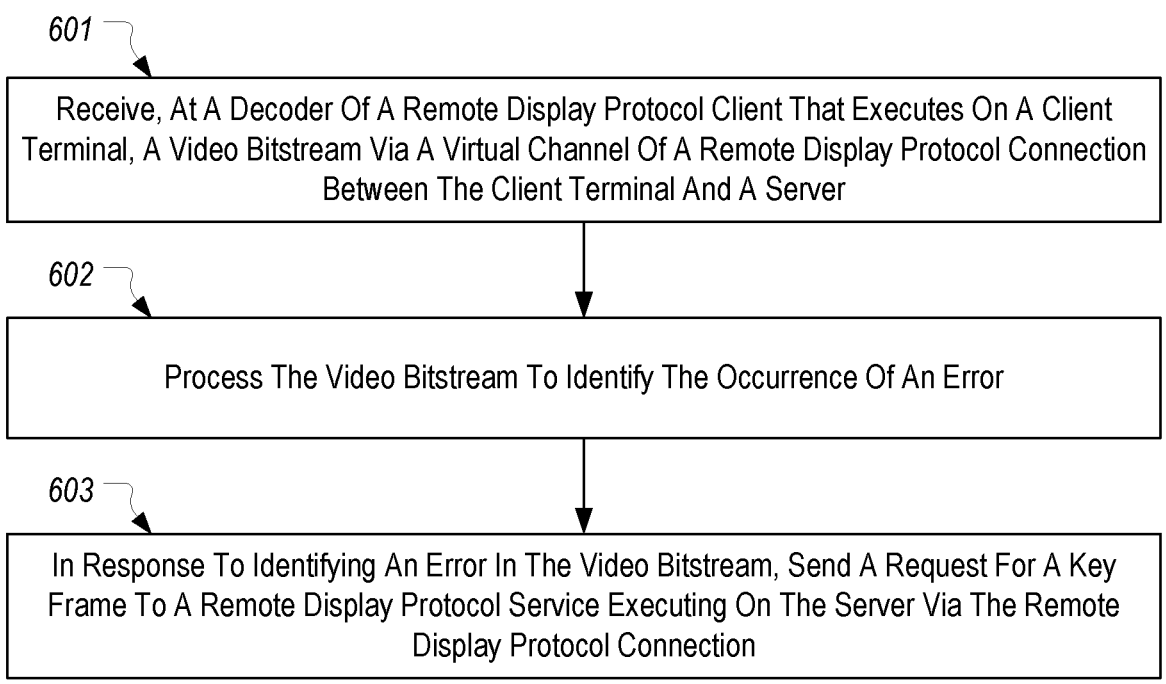
FIG. 6 illustrates a flowchart of an example method for performing fault recovery of a video bitstream in a remote session.

FIG. 6 provides a flowchart of an example method 600 for performing fault recovery of a video bitstream in a remote session. Method 600 can be performed by remote display protocol client 101 when remote display protocol connection 120 has been established with remote display protocol service 111.

Method 600 includes an act 601 of receiving, at a decoder of a remote display protocol client that executes on a client terminal, a video bitstream via a virtual channel of a remote display protocol connection between the client terminal and a remote session host. For example, decoder 101*a* can receive a video bitstream via virtual channel 120*a*.

Method 600 includes an act 602 of processing the video bitstream to identify the occurrence of an error. For example, decoder 101*a* can parse the video bitstream to extract syntax elements of the H.264 standard from RBSPs contained in NALUs and evaluate the syntax elements for errors.

Method 600 includes an act 603 of, in response to identifying an error in the video bitstream, sending a request for a key frame to a remote display protocol service executing on the remote session host via the remote display protocol connection. For example, remote display protocol client 101 can send a Client Refresh Rect PDU to remote display protocol service 111 via remote display protocol connection 120 when decoder 101*a* identifies that an error has been detected in the video bitstream transferred over virtual channel 120*a*.

Embodiments of the present invention may comprise or utilize special purpose or general-purpose computers including computer hardware, such as, for example, one or more processors and system memory. Embodiments within the scope of the present invention also include physical and other computer-readable media for carrying or storing computer-executable instructions and/or data structures. Such computer-readable media can be any available media that can be accessed by a general purpose or special purpose computer system.

Computer-readable media is categorized into two disjoint categories: computer storage media and transmission media. Computer storage media (devices) include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other similarly storage medium which can be used to store desired program code means in the form of computer-executable instructions or data structures and which can be accessed by a general purpose or special purpose computer. Transmission media include signals and carrier waves.

Computer-executable instructions comprise, for example, instructions and data which, when executed by a processor, cause a general purpose computer, special purpose computer, or special purpose processing device to perform a certain function or group of functions. The computer executable instructions may be, for example, binaries, intermediate format instructions such as assembly language or P-Code, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like.

The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices. An example of a distributed system environment is a cloud of networked servers or server resources. Accordingly, the present invention can be hosted in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description.

What is claimed:

1. A method for performing fault recovery of a video bitstream in a remote session comprising:

employing, by a remote display protocol client that executes on a client terminal, a remote display protocol to establish a remote display protocol connection with a remote display protocol service executing on a remote session host to thereby establish and communicate with a remote session;

establishing, by the remote display protocol client, a virtual channel within the remote display protocol connection between a decoder that executes on the client terminal as part of the remote display protocol client and an encoder of the remote display protocol service;

receiving, at the decoder and from the encoder, a video bitstream via the virtual channel, the video bitstream including the remote session's graphics data;

as part of decoding the video bitstream, processing, by the decoder, the video bitstream to identify the occurrence of an error;

in response to identifying an error in the video bitstream, modifying, by the decoder, the decoded video bitstream to include an indication of the error, wherein modifying the decoded video bitstream to include the indication of the error comprises setting an identifier of a slice defined in the video bitstream to an invalid value;

as part of examining the decoded video bitstream before the decoded video bitstream is provided to a hardware decoder for display, detecting, by the remote display protocol client, that the decoded video bitstream includes the indication of the error, wherein detecting that the decoded video bitstream includes the indication of the error comprises detecting that the identifier of the slice is set to the invalid value;

in response to detecting that the decoded video bitstream includes the indication of the error, sending, by the remote display protocol client and via the remote display protocol connection, a key frame request to the remote display protocol service such that the key frame request is not sent by the decoder and is not sent via the virtual channel to the encoder; and in conjunction with sending the key frame request, preventing, by the remote display protocol client, the slice with the identifier set to the invalid value from being passed to the hardware decoder.

2. The method of claim 1, wherein the video bitstream comprises an H.264 or H.265 bitstream.

3. The method of claim 1, wherein the virtual channel is a Remote Desktop Protocol: Graphics Pipeline Extension virtual channel.

4. The method of claim 3, wherein the key frame request is in the form of a Client Refresh Rect Protocol Data Unit (PDU) of Remote Desktop Protocol: Basic Connectivity and Graphics Remoting.

5. The method of claim 1, wherein processing the video bitstream comprises extracting and caching individual data units that are defined in the video bitstream.

6. The method of claim 1, wherein processing the video bitstream to identify the occurrence of an error comprises:
    detecting that a start code is not present within the video bitstream.

7. The method of claim 1, wherein processing the video bitstream to identify the occurrence of an error comprises:
    detecting that a raw byte sequence payload (RBSP) in the video bitstream has a size that is less than a defined threshold.

8. The method of claim 1, wherein processing the video bitstream to identify the occurrence of an error comprises:
    determining that a picture parameter set defines a current picture as a top field or a bottom field and a slice pertaining to the current picture has a field_pic_flag bit set to 1; and
    wherein modifying the decoded video bitstream to include the indication of the error comprises setting a slice_id of the slice to an invalid value.

9. The method of claim 1, wherein processing the video bitstream to identify the occurrence of an error comprises:
    determining that a current sequence parameter set indicates that a frame contains only macroblocks and a slice pertaining to the current picture has a field_pic_flag bit set to 1; and
    wherein modifying the decoded video bitstream to include the indication of the error comprises setting a slice_id of the slice to an invalid value.

10. The method of claim 1, wherein processing the video bitstream to identify the occurrence of an error comprises:
    determining that a current sequence parameter set indicates that a frame does not contain only macroblocks and has a direct_8×8_inference_flag bit set to 0; and
    wherein modifying the decoded video bitstream to include the indication of the error comprises setting a slice_id of any slice that references the current sequence parameter set to an invalid value.

11. The method of claim 1, wherein processing the video bitstream to identify the occurrence of an error comprises:
    determining that a first macroblock ID in a slice header of a subsequent slice is not greater than one or more macroblock IDs in a slice header of a previous slice; and
    wherein modifying the decoded video bitstream to include the indication of the error comprises setting a slice_id of the subsequent slice to an invalid value.

12. One or more computer storage media storing computer executable instructions which when executed on a client terminal implement a method for performing fault recovery of a video bitstream in a remote session, the method comprising:
    employing, by a remote display protocol client that executes on a client terminal, a remote display protocol to establish a remote display protocol connection with a remote display protocol service executing on a remote session host to thereby establish and communicate with a remote session executing on the remote session host;
    establishing, by the remote display protocol client, a virtual channel within the remote display protocol connection between a decoder that executes on the client terminal as part of the remote display protocol client and an encoder of the remote display protocol service;
    receiving, at the decoder and from the encoder, a video bitstream via the virtual channel, the video bitstream including the remote session's graphics data, the video bitstream defining slices of frames;
    as part of decoding the video bitstream, processing, by the decoder, the video bitstream to identify the occurrence of an error;
    in response to identifying an error in the video bitstream, modifying, by the decoder, the decoded video bitstream to include an indication of the error, wherein modifying the video bitstream to include the indication of the error comprises setting a slice_id of a slice defined in the video bitstream to an invalid value;
    as part of examining the decoded video bitstream before the decoded video bitstream is provided to a hardware decoder for display, detecting, by the remote display protocol client, that the decoded video bitstream includes the indication of the error, wherein detecting that the decoded video bitstream includes the indication of the error comprises detecting that the slice_id of the slice defined in the video bitstream is set to the invalid value;
    in response to detecting that the decoded video bitstream includes the indication of the error, sending, by the remote display protocol client and via the remote display protocol connection, a key frame request to the remote display protocol service such that the key frame request is not sent by the decoder and is not sent via the virtual channel to the encoder; and
    providing slices that have slice_ids set to a valid value to the hardware decoder while blocking slices that have slice-ids set to an invalid value from being provided to the hardware decoder.

13. The computer storage media of claim 12, wherein the key frame request comprises a Client Refresh Rect Protocol Data Unit (PDU) of Remote Desktop Protocol: Basic Connectivity and Graphics Remoting.

14. The computer storage media of claim 12, wherein processing the video bitstream comprises extracting and caching individual data units that are defined in the video bitstream.

15. A method for processing a video bitstream comprising:
    employing, by a remote display protocol client that executes on a client terminal, a remote display protocol to establish a remote display protocol connection with a remote display protocol service executing on a remote session host to thereby establish and communicate with a remote session executing on the remote session host;
    establishing, by the remote display protocol client, a virtual channel within the remote display protocol connection between a decoder that executes on the client terminal as part of the remote display protocol client and an encoder of the remote display protocol service;

receiving, at the decoder and from the encoder, a video bitstream via the virtual channel, the video bitstream including the remote session's graphics data;

as part of decoding the video bitstream:
  extracting, by the decoder, slices from the video bitstream;
  evaluating, by the decoder, a slice header of each extracted slice; and
  in response to detecting an error in a first slice, setting, by the decoder, a slice_id in the slice header of the first slice to an invalid value;

as part of examining the decoded video bitstream before the decoded video bitstream is provided to a hardware decoder for display, detecting, by the remote display protocol client, that the decoded video bitstream includes the first slice with the slice_id set to the invalid value;

in response to detecting that the decoded video bitstream includes the first slice with the slice_id set to the invalid value, sending, by the remote display protocol client and via the remote display protocol connection, a key frame request to the remote display protocol service such that the key frame request is not sent by the decoder and is not sent via the virtual channel to the encoder; and in conjunction with sending the key frame request, preventing, by the remote display protocol client, the first slice with the slice_id set to the invalid value from being passed to the hardware decoder.

\* \* \* \* \*